Nov. 22, 1927.
N. W. WAINWRIGHT
SAFETY SIGNAL DEVICE
Filed Sept. 23, 1926
1,649,997
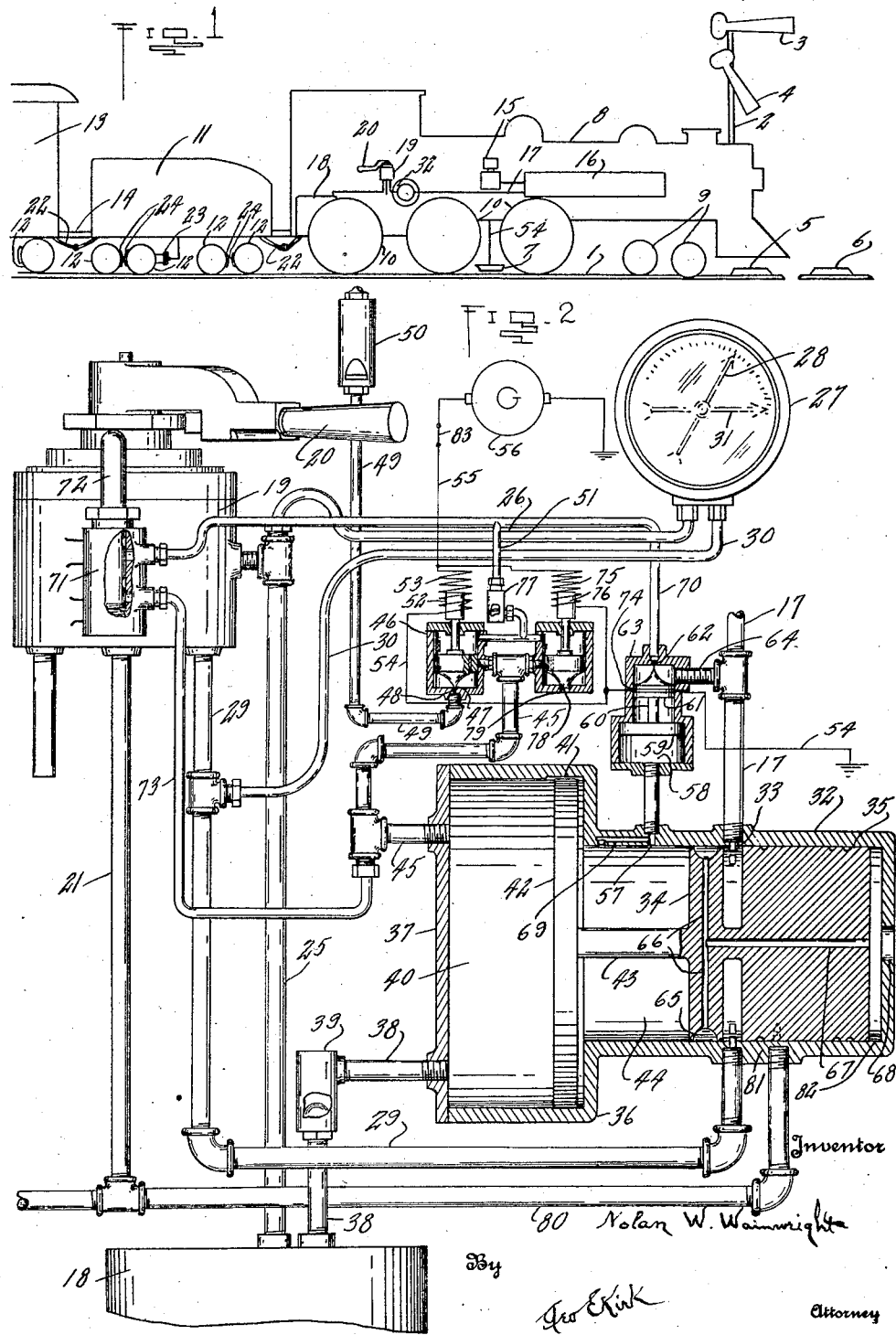

Patented Nov. 22, 1927.

1,649,997

UNITED STATES PATENT OFFICE.

NOLAN W. WAINWRIGHT, OF TOLEDO, OHIO.

SAFETY SIGNAL DEVICE.

Application filed September 23, 1926. Serial No. 137,250.

The invention relates to checking or stopping vehicles traveling on a definite way.

This invention has utility as safety equipment for railway trains with features of control for resetting.

Referring to the drawings:

Fig. 1 is a fragmentary diagrammatic showing of a lay-out or embodiment of the invention in connection with a steam locomotive propelled railway train; and Fig. 2 is a fragmentary view of the invention as embodied in the train of Fig. 1.

Railway track 1 is equipped with regular block system including semaphore 2 having arms 3, 4, for signaling the driver or engineer of the train, so as to one arm down for caution and two arms down for danger or emergency. This automatic block signaling system as co-operating with the semaphore may position shoes 5, 6, for cooperating with a contact or shoe 7 carried by locomotive 8. However, in preferred practice instead of having movable parts which may be susceptible to disturbance, fixed parts may be provided or there may be a charging of the rails of the block with electric current responding to the condition of the semaphore arms 3, 4. For instance, were the block clear there may be no charge in the rails, while with the block at caution or one arm down, there may be say a six-volt charge from the rails. With emergency there may be a different voltage say of twelve-volt charge from the rails of the block.

The locomotive 8 is shown as having wheels 9, 10, running on the track 1. This locomotive is shown as having tender 11 provided with wheels 12 on the track 1. The tender is followed by train of cars including car 13 connected by coupling 14 with the tender 11. Mounted on the locomotive 8 is air pump 15, which, in the event the equipment be of the air-pressure air-brake type, establishes a pressure of say one hundred and forty pounds in main service tank 16 and automatically maintains such. From this service tank 16 extends line 17 as main reservoir supply pipe or line. The locomotive also carries equalizing reservoir 18.

In the locomotive, for the normal manual control of this air brake installation, is placed engineer's brake valve 19 having control handle 20 therefor. From this engineer's valve 19 extends line 21 as the train line pipe having flexible connections 22 between the locomotive and tender and between the tender and car 13. This train line pipe, as thus connected, provides an air pressure supply say with the equalizing reservoir 18 at one hundred and ten pounds for maintenance of such pressure in brake equipment 23 carried by the respective cars for operating brakes 24. The equalizing reservoir 18 has connection by pipe 25 to the engineer's valve 19 with line 26 therefrom to gage 27 having indicator hand 28 for disclosing the equalizing reservoir pressure. The engineer's valve 19 as thrown into running or full release position to connect the train line pipe 21 with the main reservoir or service tank 16 simultaneously connects such main reservoir with the equalizing reservoir 18.

Pipe 29, for main reservoir pressure to the valve 19, has branch 30 also extending to the gage 27 as a supplemental indicator for operating the gage hand 31 in disclosing the main reservoir pressure to the engineer as in the cab of the locomotive 8.

In connection with this pressure air brake equipment, in accordance with the invention herein, there is interposed in the pressure line 17, 29, from the main reservoir 16, housing 32, having port 33 which in normal condition of the air brake installation allows communication between pistons 34, 35, in the housing 32, for air pressure flow from the line 17 by way of the elongated bridged port 33 to the main reservoir supply pipe 29 as extending to the engineer's brake valve 19. This housing 32 is shown as provided with enlargement or cylinder 36 having head 37 to which extends pipe 38 from the equalizing reservoir 18. This pipe 38 from the equalizing reservoir 18 has one-way check valve 39 therein permitting flow of air from the equalizing reservoir 18 into the chamber 40 as provided by the cylinder enlargement 36. However, this check valve 39 precludes flow from the chamber 40 toward the equalizing reservoir 18. This equalizing reservoir pressure as charging the chamber 40 at this position of the pistons 34, 35, wherein the port 33 is open, has seepage flow by groove 41 past piston 42 fixed by stem 43 into rigid connection with the pistons 34, 35. This groove 41 in the cylinder 36 allows communication of the pressure from the chamber 40 to chamber 44 in the housing 32 about the piston stem 43. This pressure as so maintained is at one hundred and ten pounds or the pressure of the equalizing reservoir and is a reserve operating pressure for the device of this disclosure, being an expansible medium.

The cylinder head 37 has pressure line 45 extending to housing 46 having therein needle valve 47 controlling vent 48 connected by pipe 49 to whistle 50 as an audible signal at the exhaust for this vent. This needle valve 47 is normally maintained seated by the weight of core 52 as a plunger for a solenoid having winding 53 as lifting the valve 47 opening the line 45 for air flow. From this winding 53 extends line 54 to shoe 7, if there be contact operation with shoe 5 or 6 thereby to complete circuit from such winding 53 by line 55, and generator 56 carried by the locomotive 8, is in this circuit through the rails and the wheels of the locomotive.

In the event the rails 1 are energized for the block, the completion of the circuit from an insulated wheel, or contact 7 of the locomotive, through the coil or winding 53 serves as the energizing means for this winding 53.

In the event the locomotive 8 is traveling along the track 1, and the control handle 20 of the engineer's valve 19 is in any position, with the caution signal on, there is energizing of the coil 53 to lift the needle valve 47 against gravity and pressure action thereby allowing venting from the cylinder 40 by way of line 45 and the audible signal 50. This immediately brings about a drop in pressure in the chamber 40. The vent at the needle valve 47 is considerably greater than the capacity of the groove 41 as communicating with the chamber 40 past the piston 42. Accordingly, there is the trapped pressure of one hundred ten pounds in the chamber 44, which, as the chamber 40 is vented, starts shifting of the piston 42 to complete the closure of the groove 41, while the vent at the needle valve 47 is operative for reducing the pressure of the air, not only in the chamber 40, but in the equalizing reservoir 18. This reduction in pressure may be gradual and say effect a drop of thirty pounds in the equalizing reservoir 18 and the train line pipe 21. As the piston 42 moves to complete the closing of the groove 41 and continues its movement in reducing the capacity of the chamber 40, as brought about by the expansion of the air in the chamber 44, the stem 43 from the piston 42 causes the pistons 34, 35, to move with the piston 42 and transversely of the port 33 in the housing 32, thereby cutting off or closing communication between the main reservoir 16 and the engineer's valve 19. This means that pressure air supply from the pipe 17 is not supplied through the main reservoir supply pipe 29. The reduction of pressure in the equalizing reservoir 18 and train line pipe 21 is accordingly effective for a gradual setting of the brakes for the train.

The expansion of the medium in the chamber 44 tends to continue the travel of the piston 42 in reducing the capacity of the chamber 40. Located along the housing 32, at a point which may be say for the thirty pound drop as effected by the expansion of the medium in the chamber 44, may be port 57 in communication with chamber 58 having therein piston 59. From this piston 59 extends stem 60 to materially smaller piston 61. These pistons 59, 61, are connected with needle valve 62 and assembled in housing 63. From the main reservoir pressure line 17 extends branch line 64 to this housing 63 adjacent the needle valve 62.

The one hundred ten pound pressure in the chamber 44, as well as some degree of drop therefrom, is effective as acting upon the piston 59 to maintain the needle valve 62 closed. At this predetermined position for the port 57 in the housing 32, piston 34 comes into registry with this port 57 to have groove 65 of this piston 34 in communication with this port 57. This groove 65 is connected by radial ducts 66 and coaxial duct 67 through the piston 35 with exhaust port 68 from this housing 32. Accordingly, at this position of the pistons 42, 34, 35, there may be a quick drop in pressure in the chamber 58, thus allowing a pressure from the line 64 as acting upon the piston 61 to open the needle valve 62. This drop in pressure is not only for the chamber 58, but for the residual portion of the chamber 44 as this port 57 has branch 69 extending along the housing 32 toward the piston 42. There is, accordingly, an exhausting of the pressure in the chamber 44.

The opening of the needle valve 62 connects air pressure line 64 with line 70 extending to valve 71 adjacent the handle 20 of the engineer's valve 19. This valve 71 has plunger 72 operable by the handle 20 when in fully released position to connect the line 70 with line 73 extending to the line 45. As the pressure in the chamber 58 drops, and the pressure in the line 64 is effective to unseat the needle valve 62, this shifting of the pistons 59, 61, is effective at switch 74 to break the circuit to the coil or winding 53, thus de-energizing such coil 53 and allowing the plunger 52 to act in closing the needle valve 47, such closing being supplemented by air from the line 70, and branch 51 past check valve 77. Accordingly, this supply of pressure air to the line 73, which is manually controlled in the reset, in so far as there is necessity for the engineer's valve 19 to have its handle 20 in fully released position, is now effective to flow from this line 73 by the line 45 to charge the chamber 40. This is permitted as the vent at the needle valve 47 is closed. The check valve 39 precludes flow of this pressure air to the equalizing reservoir 18. This building up of the pressure air in the chamber 40 tends to shift the pistons 42, 34, 35, reversely from that of the operation described and as the piston 42 reaches the end of its stroke and the pistons 34, 35, open the port 33, there is not only flow of pressure air from the chamber 40, by the groove 41 to charge the chamber 44, but there is flow of pressure air from the reservoir 16 by way of line 17, port 33, through the housing 32 to the main reservoir supply line 29 as in communication with the engineer's valve 19 to build up the pressure in the equalizing reservoir 18 and the train line pipe 21, to release the brakes.

This flow of air to the chamber 44 from the chamber 40 builds up pressure in the chamber 58 to cause the piston 59 to operate against the action of the piston 61 and close the needle valve 62 as the equipment is fully reset for a repetition of this cycle of operations as the condition along the way of travel of the train may bring about.

The operation as described has been in connection with a service or caution operation from the coil 53. In the event emergency operation is desired, supplemental coil 75 is provided in parallel with the coil 53, but ineffective in the normal operation of the coil 53 say by the six-volt current, but effective in the danger or emergency operation, and as so effective pulling solenoid plunger 76 for clearing the port from the pipe 45 by operating valve 78 for opening exhaust port 79 of greater area than the vent at needle valve 47. This effects a more rapid reduction in the pressure in the chamber 40 than is effected by the opening of the needle valve 47 and as here disclosed is in addition to the opening of the needle valve 47. This means a quick drop in pressure in the chamber 40, as well as in the equalizing reservoir 18. In connection with this mode of operation, there may be provided from the train line pipe 21, branch pipe 80 to the housing 32 having port 81 opened by the travel of the piston 35 and having communication with chamber 82 and thence by way of exhaust 68. There is thus an emergency exhausting of the train line pipe 21 bringing about a quick setting of the brakes in the train notwithstanding the engineer's valve handle 20 may be at fully released or any position.

The device of this disclosure is one which is compact and simple in its construction conforming to the practice as current in air brake installations, as well as to the practice in block signaling in the use of voltage changes in the equipment. The regular installations for the block signaling and for the air brake installations may operate in their normal usual way. This safety device is merely a supplemental device cut into the supply line from the main reservoir to the engineer's brake valve with the equalizing reservoir communication thereto for the control pressure. In operation, as the train passes a caution signal and the engineer has not taken such into account by positioning the brake valve handle 20, this device is effective through energizing of the coil 53 or in the emergency of both the coils 53 and 75, and there results at once the audible signal of the whistle 50 to the engineer. There is the venting for caution or service at port 48, while for emergency at both the port 48 and the exhaust 79. This brings about a drop of pressure in the chamber 40, as well as in the equalizing reservoir 18, during the movement of the actuator or control device of this invention involving the plurality of pistons 42, 34, 35. At the initial movement the piston 42 closes the groove 41 to husband the control expansion medium in the chamber 44 as the supply air is cut off from the reservoir 16 by the piston 35 closing the port 43. The drop in pressure will serve to operate the brake cylinders 23 in setting the brakes 24. At the determined travel, the groove 65 in piston 34 has moved into registry with the port 57 to exhaust the compression medium from the chamber 44, as well as reduce the pressure in the chamber 58 so that the valve 62 is opened. In the event of emergency braking, this travel of the piston 35 may be to open port 81 and allow the quick exhausting of the train line pipe for setting the brakes throughout the equipment. This operation of the valve 62 in supplying the pressure air to be controlled by the handle 20 for re-charging chamber 40 also cuts out the energizing current for the coil 53 or coils 53, 75, so that the position of the handle 20 for re-charging chamber 40 by opening the valve 71, 72, may be without such re-charging air being vented or lost at port 48 or port 79. As this pressure is built up in the chamber 40 effecting the resetting of the piston 42, there is a simultaneous resetting of the pistons 34, 35, with the pressure air connection made at the port 33 for the line 29 in recharging the equalizing reservoir 18 to bring the equipment again into service condition.

The pressure seating of the valves 47, 78, is positive. During air discharge from the line 45, such flow may maintain the valves open even if the coils be deenergized, as in the instance that the energized track portion is only momentary in opening the valve 47 or the valves 47, 78. The venting is accordingly maintained until there is pressure air in the line 70 and then the valves 47, 78, are pressure closed.

In the event an engineer should for any reason wish to pass a block without having the block cause the safety apparatus to operate the brakes, such may be accomplished by means of a forestalling switch 83 in the line 55. This may be a manually operable switch which is normally held closed.

What is claimed and it is desired to secure by United States Letters Patent is:—

1. Air brake equipment comprising a first line to a car for its brake, a control valve therefor, a second line connectible to the car line by said valve, and a supplemental controller in said second line including a ported way, a reciprocable plunger for opening and closing said way, a piston for shifting with said plunger, a housing for the piston and valve, and an actuator as to which the car may move for bringing about piston and plunger travel in port control operation of the plunger.

2. An air brake equipment installation embodying a train line, a second line, an engineer's valve between said lines, a port in the second line, a controller for the port including a piston and cylinder, a connection between the engineer's valve and cylinder, a second valve for modifying the effect of said connection upon the cylinder, and an actuator for the second valve as to which the second valve is movable.

3. A pressure air brake equipment installation embodying a train line, a second line, an engineer's valve between said lines, a main pressure reservoir for the second line, an equalizing reservoir connected to the train line through said engineer's valve, a cut-off device between the main reservoir and engineer's valve, a piston and cylinder device for operating said cut-off device, connection from the equalizing reservoir to the cylinder, and a controllable vent for the cylinder for lowering equalizing reservoir pressure.

4. A pressure air brake equipment installation embodying a main reservoir supply, a line to a car brake supplied thereby, an equalizing reservoir connectible to said line, valve between the supply and line, and a pneumatically operable device for said valve for cutting off pressure air supply connection to the line and venting said device at said valve.

5. A pressure air brake equipment installation embodying a main reservoir supply, a line to a car brake supplied thereby, a manually controllable valve for the line, a piston and cylinder device, a control for effecting a pressure drop for operating the device in the on position of the manually controllable valve for reducing the pressure in said line, a cutoff for said control, and a vent for the device on the opposite side of the piston from said pressure drop control for rendering the cutoff effective.

6. A pressure air brake equipment installation embodying a main reservoir supply, a line to a car brake supplied thereby, a manually controllable valve for the line, a cutoff valve between the supply and line, a piston and cylinder operator for the valve, a control for the piston and cylinder effecting a pressure change on one side of the piston in the on position of the manually controllable valve for operating the cutoff valve for cutting off pressure air supply to the line, said cylinder having a port on the opposite side of the piston from said control, and a cutoff for the control operable by the valve shifting as to said port.

7. A pressure air brake equipment installation embodying a main reservoir supply, a line to a car brake supplied thereby, an equalizing reservoir connectible to said line, a cut-off device for the supply, a vent for the device, a manually operable valve, and a control for the cut-off device operable upon the device shifting as to the vent with the valve in the on position for checking cutoff device from further operation.

8. A pressure air brake equipment installation embodying a main reservoir supply, a line to a car brake supplied thereby, an equalizing reservoir connectible to said line, a cut-off device for the supply, a pneumatic actuator for the cut-off device, a one-way flow connection from the equalizing reservoir to the actuator, and a safety control for venting the actuator to render the cut-off device operable and simultaneously lower the pressure in the equalizing reservoir.

9. A pressure air brake equipment installation embodying a main reservoir supply, a line to a car brake supplied thereby, an equalizing reservoir connectible to said line, a cut-off device for the supply, a pneumatic actuator for the cut-off device, a one-way flow connection from the equalizing reservoir to the actuator, a vent for the actuator, an audible signal operable by the vent, a car carrying the installation, a way for the car, and a control for the vent responsive to way condition for operating the cut-off device and vent.

10. A pressure air brake equipment installation embodying a main reservoir supply, a line to a car brake supplied thereby, an equalizing reservoir connectible to said line, a cut-off device for the supply, a pneumatic actuator for the cut-off device, a one-way flow connection from the equalizing reservoir to the actuator, a safety control for venting the actuator to render the cut-off device operable and simultaneously lower the pressure in the equalizing reservoir, and a line exhaust operable by said actuator.

11. A pressure air brake equipment installation embodying a main reservoir supply, a line to a car brake supplied thereby, an equalizing reservoir connectile to said line, a cut-off device for the supply, a pneumatic actuator for the cut-off device, a one-way flow connection from the equalizing reservoir to the actuator, a vent for the actuator, a car carrying the installation, a way for the car, a control for the vent responsive to way condition for operating the cut-off device and vent, and a line exhaust operable by said actuator.

12. A pressure air brake equipment installation embodying a main reservoir supply, a line to a car brake supplied thereby, an equalizing reservoir connectible to said line, a cut-off device for the supply, a pneumatic actuator for the cut-off device, a one-way flow connection from the equalizing reservoir to the actuator, a vent for the actuator, a car carrying the installation, a way for the car, a control for the vent responsive to way condition for operating the cut-off device and vent, and a line exhaust operable by said actuator, said way having a plurality of control actuation conditions and said control having actuating connections selectively responsive thereto to operate the vent and cut-off device additionally operating said line exhaust.

13. An air brake safety operating mechanism including a cut-off device, a vent, a trapped chamber of operating air for continuing the operation of the vent, and a control for exhausting said trapped chamber for thereby limiting the trapped chamber operation for timing the vent.

14. An air brake safety operating mechanism including a cut-off device, a vent, a trapped chamber of operating air for continuing the operation of the vent, a control for exhausting said trapped chamber for thereby limiting the trapped chamber operation for timing the vent, and device resetting connections coacting through said control.

In witness whereof I affix my signature.

NOLAN W. WAINWRIGHT.